United States Patent
Su

(10) Patent No.: US 6,233,011 B1
(45) Date of Patent: May 15, 2001

(54) APPARATUS AND METHOD FOR COMPENSATING IMAGE BEING SENSED

(75) Inventor: Phil Su, Taipei (TW)

(73) Assignee: Acer Peripherals, Inc. (TW)

( * ) Notice: Subject to any disclaimer, the term of this patent is extended or adjusted under 35 U.S.C. 154(b) by 0 days.

(21) Appl. No.: 08/878,202

(22) Filed: Jun. 18, 1997

(30) Foreign Application Priority Data

Feb. 15, 1997 (TW) ................................. 86101784

(51) Int. Cl.[7] ........................ H04N 5/202; H04N 5/228
(52) U.S. Cl. ...................... 348/254; 348/222; 348/250; 358/455; 358/482
(58) Field of Search .................................. 382/276, 280; 358/518, 519, 448, 455, 458, 482, 483; 348/207, 222, 241, 250, 254, 671, 673, 674; H04N 5/202, 5/14, 5/228

(56) References Cited

U.S. PATENT DOCUMENTS

| | | | |
|---|---|---|---|
| 4,670,788 | * 6/1987 | Ozaki | 348/671 |
| 4,823,194 | * 4/1989 | Mishima | 348/254 |
| 5,335,013 | * 8/1994 | Faber | 348/254 |
| 5,604,545 | * 2/1997 | Chatterjee | 348/671 |
| 5,818,521 | * 10/1998 | Hieda | 348/674 |
| 5,936,684 | * 8/1999 | Murayama | 348/671 |

* cited by examiner

*Primary Examiner*—Wendy R. Garber
*Assistant Examiner*—Ngoc-Yen Vu
(74) *Attorney, Agent, or Firm*—Pillsbury Winthrop LLP Intellectual Property

(57) ABSTRACT

An apparatus and a method for compensating the gray-scale values of an image scanned by a contact image sensor. The gray-scale compensating apparatus includes: a power supply for providing a fixed level of voltage source, a contact image sensor for scanning an image and outputting image voltages $V_{IMG}$ of pixels of the image, or scanning a white pixel and outputting the white-level voltage $V_P$ of the white pixel, an analog/digital converter, to receive the fixed voltage from the power supply and the image voltage $V_{IMG}$ or the white-level voltage $V_P$, a microprocessor to calculate the average of n white-level values G(x, y), where n is an integer, and the average value G'(x)=(G(x, 0)+G(x, 1)+ ... +G(x, n−1))/n. The microprocessor also determines the gray-scale values g'(x, y) of the image being compensated by calculating the gray-scale values g(x, y) of the image not compensated in accordance with the value of G'(x).

13 Claims, 4 Drawing Sheets

APPARATUS AND METHOD FOR COMPENSATING IMAGE BEING SENSED

BACKGROUND OF THE INVENTION

1. Field of the Invention

This invention relates to an apparatus and a method for compensating images being sensed, more particularly to an apparatus and a method for compensating the gray-scale values of an image scanned by a contact image sensor, which is applied to opto-electric products such as facsimile machines, scanners and digital cameras and so on.

2. Description of Prior Art

Normally, the use of a contact image sensor (hereinafter referred to as CIS) to sense an image is based on an assumption that the contact image sensor generates a fixed gray-scale voltage ($V_P$), such as 1 V, while a white-level pixel is scanned by the contact image sensor, and defining that the gray-scale voltage $V_P$ corresponds to the gray-scale value 255. The gray-scale value of the other pixels is calculated corresponding to the gray-scale value of the white-level pixel. For example, if the CIS scans a pixel and generates an image voltage $V_{IMG}$ of 0.2 V, the image voltage $V_{IMG}$ is one-fifth of the gray-scale voltage $V_P$. In other words, the gray-scale value of the scanned pixel equals to 51 (i.e., 255×0.2/1).

According to the specification of today's commercial CISs, the white-level voltage of a CIS is normally variable between 0.8 V and 1.2 V for different manufacturers. Furthermore, there is an uniformity problem in a CIS due to the manufacturing errors and the substantial error of the CIS itself. The output $V_{POUT}$ of white-level voltage of the CIS is $V_P \pm 30\%$ V. Referring to FIG. 1, it is possible to generate a high voltage while a white-level pixel is right under the light source element 5 such as when the LED of the CIS is scanned by the sensor 6, and a low voltage while a white-level pixel positioned between two light source elements 5 is scanned. Hence, different white-level voltages $V_P$ can be generated by scanning identical white-level pixels. Accordingly, a possible white-level voltage output of a CIS varies in a range from 0.56 V to 1.56 V for different manufacturers. The highest reference voltage is therefore defined as 1.6 V in the embodiment described later.

Due to this white-level uniformity problem, the voltages $V_P$ being output may not be identical when scanning different white-level pixels. The difference that occurs in the white-level voltage output may cause gray-scale distortion of an image being output. For example, a CIS that can actually output a white-level voltage $V_P$ of 0.9 V, which is defined as 1 V in the spec., scans a pixel and generates an image voltage $V_{IMG}$ of 0.45 V. The correct gray-scale value for the pixel should be 128 (=255×0.45/0.9). However, according to the spec., the CIS outputs a gray-scale value of 114 (=255×0.45/1) for the pixel. This causes the gray-scale value of the pixel to be too low, and the color of the image at the pixel is too light. Therefore, it is necessary to compensate the gray-scale value of an image being scanned in the image reading device, which has a CIS element in the reading portion thereof, such as a facsimile machine, a scanner or a digital camera.

At the present, most of the image-compensating technologies used in a CIS of an image-reading device involve use of an analog/digital converter, digital/analog converter and an operational amplifier. Referring to FIG. 2, a conventional image-compensating device for a CIS includes: a microprocessor 10; a memory 12; a digital/analog converter 14; a CIS 16; a sample-and-hold circuit 18; an operational amplifier 20; and an analog/digital converter 22. The image-compensating device works according to the following procedures:

(1) The voltage output $V_P$ defined in the spec. of the CIS is first output to the $V_{TOP}$ terminal of the analog/digital converter 22. The transversal axis of the CIS 16 is assumed to extend along x-coordinate, and the CIS scans a white plate along y-coordinate for 20 scan-lines of pixels (i.e., from y=0 to y=19). Then the white-level voltage outputs of the pixels are output to the analog/digital converter 22 to generate the white-level value G(x,y) of each pixel, where $0 \leq y \leq 19$ and x varies with the width of the CIS, that is, a wider CIS can scan a larger range along the x-coordinate direction.

(2) According to the white-level values obtained in the previous step, for each scan line, an average white-level value G'(x) is calculated by the following equation:

$$G'(x) = [G(x,0)+G(x,1)+G(x,2)+ \ldots +G(x,19)]/20,$$

and the average value G'(x) is stored in the memory 12.

(3) The average gray-scale value G'(x) corresponding to each x-coordinate stored in the memory is retrieved by a microprocessor 10 and output to the digital/analog converter 14, so that the digital/analog converter 14 can sequentially generate an average white-level voltage output $V'_P$ corresponding to each x-coordinate in the next step.

(4) When the CIS 16 is reading image data, it is operated as follows: the transversal axis of the CIS 16 extends along the x-coordinate, and the CIS 16 moves in the y-coordinate direction. The CIS 16 sequentially reads a plurality of pixels corresponding to a y-coordinate as they move along a direction of increasing x-coordinate values. The voltage outputs $V_{IMG}$ generated corresponding to the plurality of pixels are sequentially input to the terminal Analog of the analog/digital converter 22. While inputting the voltage $V_{IMG}$ of some x-coordinate, the average white-level voltage $V_P'$ is simultaneously input to the terminal $V_{TOP}$ of the analog/digital converter 22. Then the compensated gray-scale values of the pixels on the x-coordinate can be calculated by $V_{IMG}$ and the corresponding $V_P'$.

Compensating the gray-scale of an image by such analog technology involves not only a high initial cost but also a complex structure. For instance, the conventional image compensating device requires that the digital/analog converter 14 convert digital gray-scale values into analog voltages to perform gray-scale compensation since the memory can only store digital data. Further, different voltages $V_P'$ are required for the terminal $V_{TOP}$ of the analog/digital converter while compensating the gray-scales of the pixels of different x-coordinates. Therefore, the analog/digital converter cannot compare $V_{IMG}/V_{TOP}$ until the voltage $V_P'$ input to the terminal $V_{TOP}$ is stable. A next pixel is then sampled after the comparing operation. This results in a slow operating speed of the compensating device. A sample-and-hold circuit is needed to sample the image voltage $V_{IMG}$ of the pixel being scanned and to hold the sampled voltage for a predetermined period.

SUMMARY OF THE INVENTION

Accordingly, the object of the present invention is to provide an apparatus and a method for compensating images being sensed, which is particularly used in opto-electrical devices that use a contact image sensor to sense images. Instead of the expensive digital/analog converter, the compensating apparatus utilizes a plurality of precise resistors and an analog multiplexer. The compensating apparatus can operate at a high speed and the sample-and-hold circuit can be omitted by compensating each pixel with digital technology in this invention. As a result, the structure is simplified and the fabrication cost is reduced.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1:
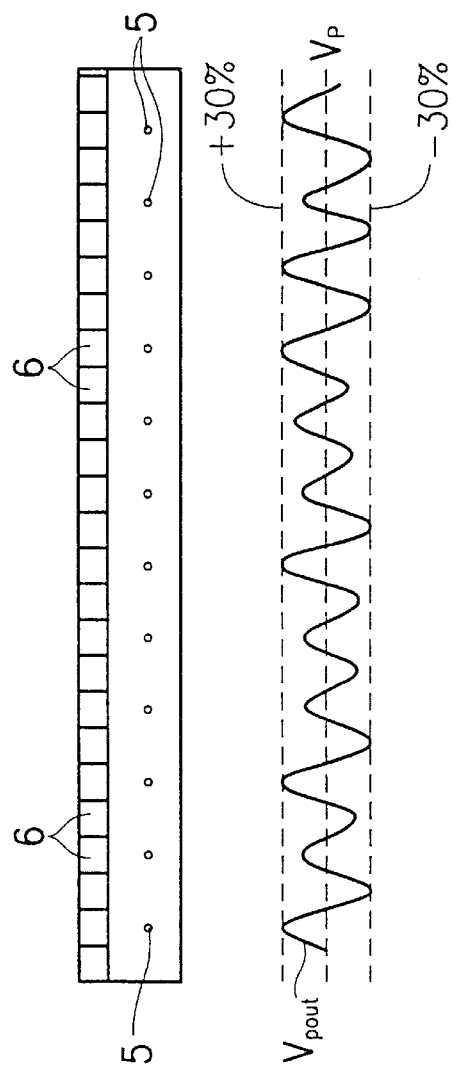
FIG. 1 is a diagram illustrating the variation of image voltage generated by using a CIS to scan a white plate.
Figure 2:
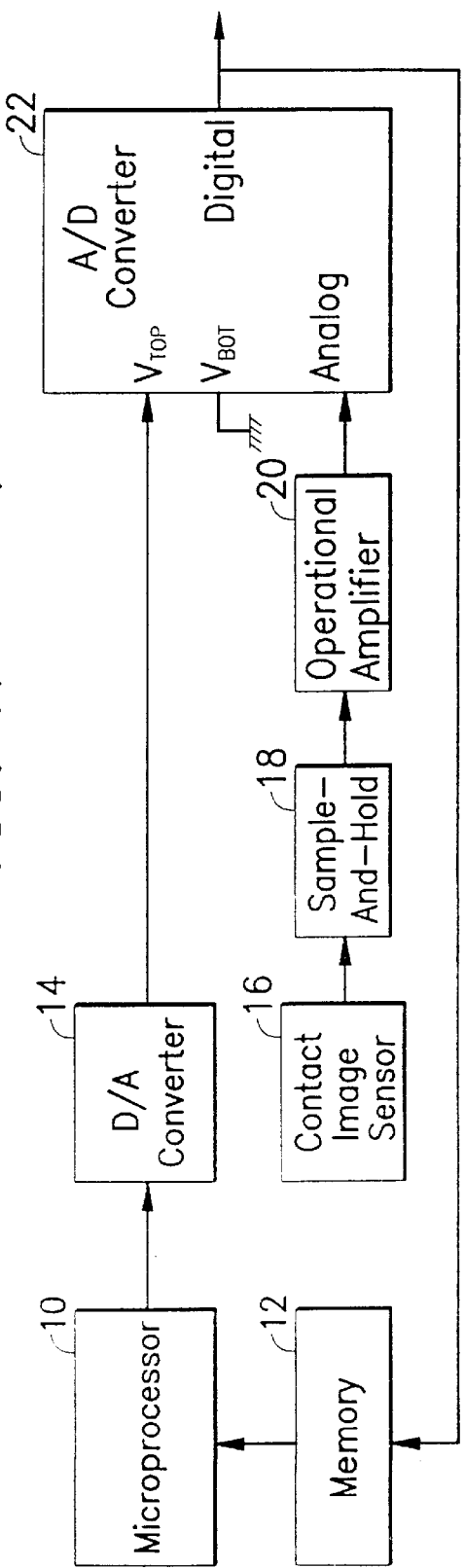
FIG. 2 is a diagram illustrating the structure of a conventional image-compensating apparatus.

Referring to FIG. 1, according to the spec. of a normal commercial CIS, the white-level voltage $V_P$ is generally defined in the range between 0.8 V and 1.2 V. Further, the white-level uniformity ($V_U$) is unsteady, which may cause the white-level voltage $V_P$ to deviate 30%. That is, the white-level voltage $V_P$ varies in the range from 0.56 V to 1.56 V. Therefore, the maximum white-level voltage of any of today's commercial CISs is never higher than 1.6 V. Accordingly, the top voltage supply is defined as 1.6 V in the image-compensating apparatus of this invention.

Figure 3:
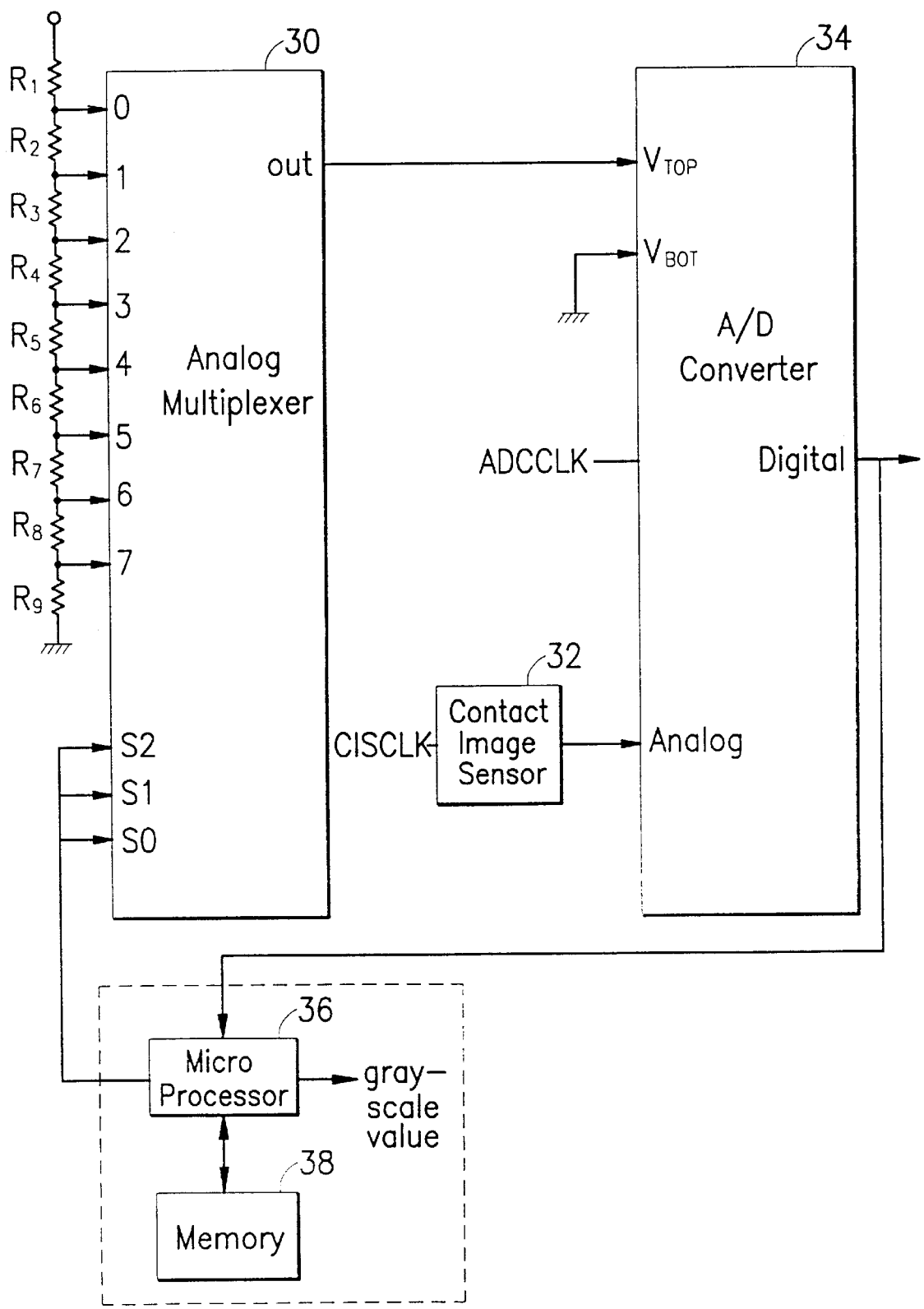
FIG. 3 is a diagram illustrating the structure of an image-compensating apparatus according to this invention.

Referring to FIG. 3, the image-compensating apparatus of the present invention comprises: a plurality of precise resistors $R_1 \sim R_9$, for dividing an input voltage $V_{CC}$ into plural levels of voltages such as 0.9 V, 1.0 V, 1.1 V, 1.2 V, 1.3 V, 1.4 V, 1.5 V and 1.6 V; an analog multiplexer 30, for inputting the plural levels of voltages and optionally outputting one of the plural levels of voltages by being controlled by a digital signal having three bits (S2, S1, S0); a CIS 32, having the transversal axis thereof extends along the x-coordinate, for simultaneously scanning a plurality of pixels on the same y-coordinate, and sequentially generating the image voltages $V_{IMG}$ corresponding to the pixels; an analog/digital converter 34, for receiving the voltage outputted from the analog multiplexer 30, which serves as the top voltage $V_{TOP}$, and the image voltages $V_{IMG}$ of the pixels being scanned, so that the image voltage $V_{IMG}$ of each pixel is compared with the top voltage $V_{TOP}$ to output the white-level value or the original gray-scale value, then the original gray-scale value is compensated by the microprocessor 36.

In the image-compensating apparatus mentioned above, the analog multiplexer 30 can be a 4051 analog switch, the CIS 32 can be a 200-dpi, A4-size CIS, for example, model DL100-26AN manufactured by Dyna Co, which can read 1728 pixels on x-coordinate. The analog/digital converter 34 can be a 1175 analog/digital converter, e.g., manufactured by SPT.

Figure 5:
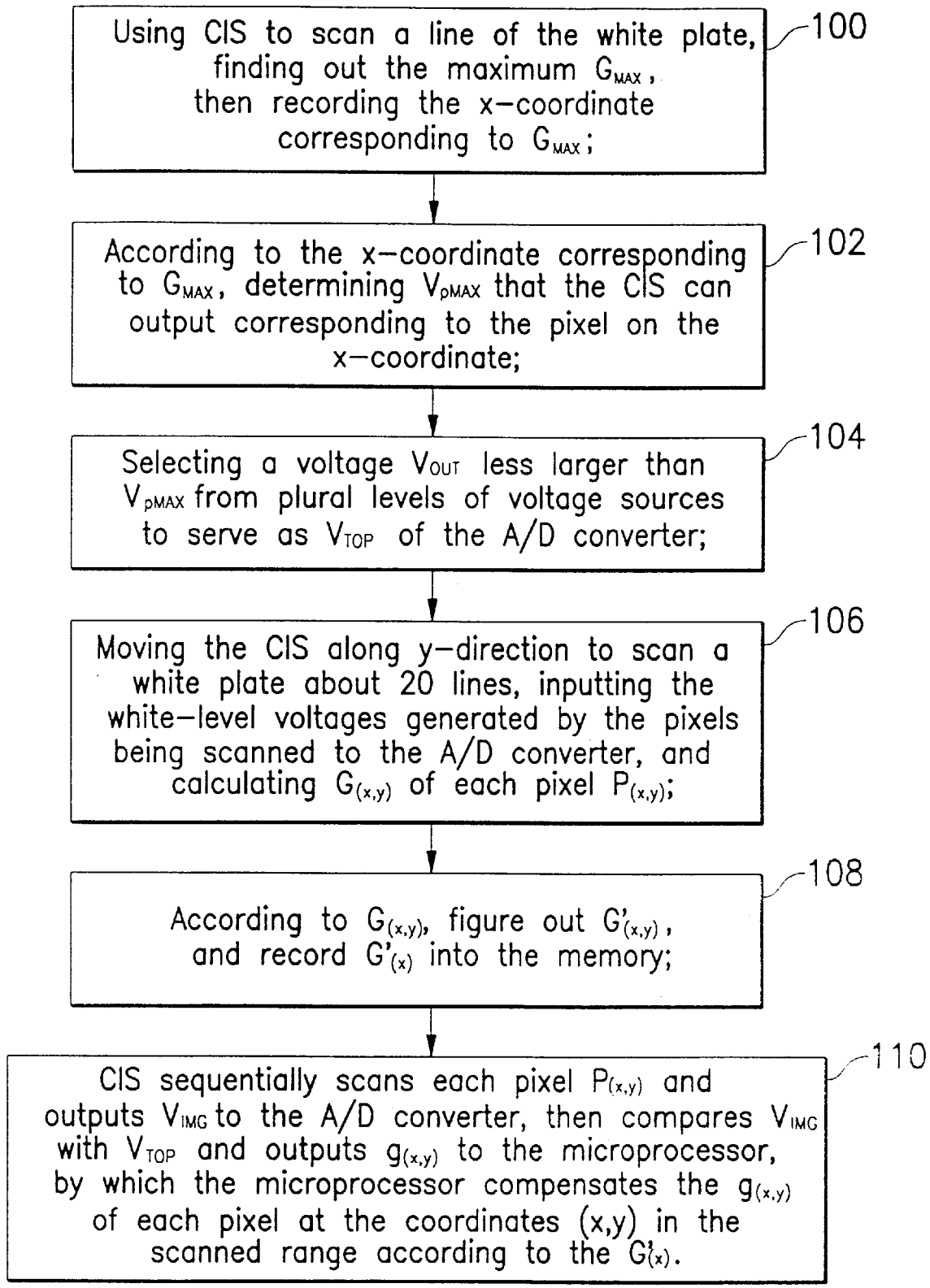
FIG. 5 illustrates a flow diagram of the image-compensating apparatus according to the present invention.

Referring to FIG. 5, that a CIS can read 1728 pixels simultaneously is used to describe the image-compensating method of the present invention, which comprises:

setting the control signal (S2, S1, S0) as (0, 0, 0) to select 1.6 V as the top voltage $V_{TOP}$ of the analog/digital converter 34, using the CIS 32 to scan a line of the white plate (i.e., 1728 white-level pixels), comparing the outputs of the analog/digital converter 34 with each other to determine the maximum white-level value $G_{MAX}$, which is an integer between 0 and 255, for the pixels on P(0,0)–P(1727,0) (i.e., y-coordinate equals 0 and x-coordinate is between 0 and 1727), then recording the x-coordinate corresponding to $G_{MAX}$;

according to the x-coordinate corresponding to $G_{MAX}$, determining the maximum voltage $V_{PMAX}$ that the CIS 32 can output corresponding to the pixel on the x-coordinate;

selecting a voltage $V_{OUT}$ larger than and closest to the maximum white-level voltage $V_{PMAX}$ from plural levels of voltage sources, such as 0.9 V to 1.6 V with a step of 0.1 V, to serve as the top voltage $V_{TOP}$ of the analog/digital converter 34, for example, if $V_{PMAX}$ equals 1.18 V, then $V_{OUT}$ is set equal to 1.2 V to serve as $V_{TOP}$ of the analog/digital converter 34, and the control signal (S2,S1,S0) is encoded as (1,0,0) to make the analog multiplexer 30 output 1.2 V;

moving the CIS 32 along y-direction to scan a white plate about 20 lines, that is, to scan the white plate from y=0 to y=19, inputting the white-level voltages generated by the pixels being scanned to the analog/digital converter 34, and calculating the white-level value G(x,y) of each pixel P(x,y), wherein $0 \leq x \leq 1727$ and $0 \leq y \leq 19$;

according to the white-level G(x,y), figuring out an average white-level G'(x) corresponding to each x coordinate by the following equation:

$$G'(x)=[G(x,0)+G(x,1)+G(x,2)+\ldots+G(x,19)]/20,$$

where $0 \leq x \leq 1727$, and recording G'(x) into the memory 38;

while reading images, sequentially scanning each pixel P(x,y) and outputting the image voltage $V_{IMG}$ to the analog/digital converter 34 by the CIS, then comparing the image voltage $V_{IMG}$ with $V_{TOP}$ and outputting the original gray-scale value g(x,y) to the microprocessor 36, by which the microprocessor 36 compensates the gray-scale g(x,y) of each pixel at the coordinates (x,y) in the scanned range according to the average white-level value G'(x). For instance, when the analog/digital converter 34 sequentially outputs the gray-scale values g(x,y), where $0 \leq x \leq 1727$ and y equals to a constant k, the microprocessor 36 first divides g(x,y) to the average white-level value G'(k) corresponding to the x-coordinate, then multiplies the result with M to obtain the compensated gray-scale values g'(x,y) for the pixels corresponding to each x-coordinate, wherein M is a maximum value of defined white-level, such as 255.

In other words, if the average white-level value corresponding to the x-coordinate is G'(x), the original gray-scale value for a pixel is g(x,y), and is g'(x,y) for a compensated gray-scale value for that pixel, then the relation is as follows:

$$g'(0, y) = 255 \times g(0, y)/G'(0),$$
$$g'(1, y) = 255 \times g(1, y)/G'(1),$$
$$\vdots$$
$$g'(x, y) = M \times g(x, y)/G'(x), \text{ where the maximum of the white-level value M equals to 255.}$$

The above multiplication and division can be completed by the microprocessor 36 in a computer. In this way, the efficiency of the compensating apparatus can be maintained and the initial cost can be reduced.

In comparison with the conventional image-compensating apparatus, since a different $V_{TOP}$ is required for each different pixel with different x-coordinates while compensating the gray-scale of image, an analog/digital converter used in the conventional image-compensating apparatus is operated at a slow speed. Therefore, a sample-and-hold circuit is required to sample the image voltage $V_{IMG}$ of the pixel being scanned and hold the sampled voltage for a predetermined period. The sample-and-hold circuit does not sample the next pixel until $V_{TOP}$ of the analog/digital converter is stable and the comparison of $V_{IMG}/V_{TOP}$ is finished.

However, in this invention, because $V_{TOP}$ required for each pixel with different x-coordinate is the same while compensating the gray-scale of images, the analog/digital converter can be operated at a high speed. No sample-and-hold circuit is needed by synchronizing the speed of inputting image voltage $V_{IMG}$ to the analog/digital converter and the speed of outputting the gray-scale value of each pixel for the multiplication and division operation.

Figure 4:
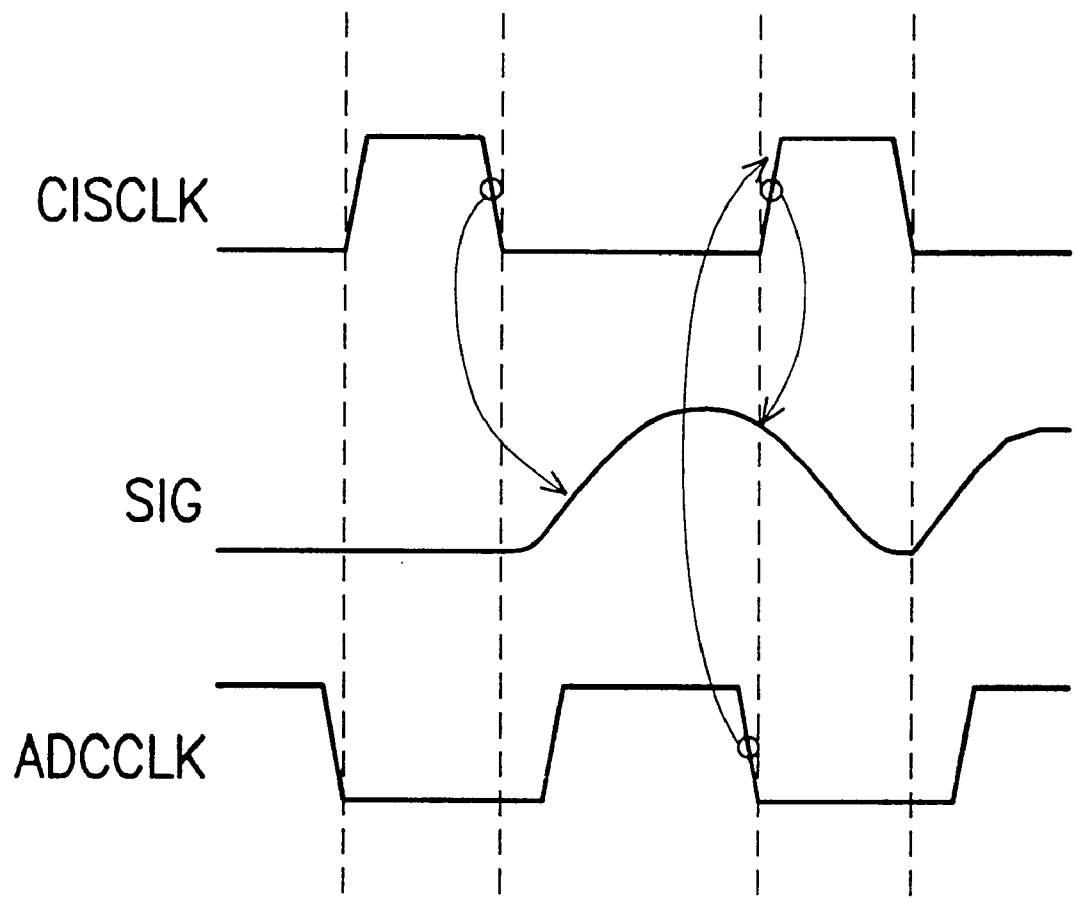
FIG. 4 illustrates a timing diagram for the operation of the image-compensating apparatus of the present invention.

Referring to FIG. 4, CISCLK is the timing signal of the CIS, SIG represents the pixel data being input to the terminal Analog of the analog/digital converter from the CIS, and ADCCLK is the timing signal of the analog/digital converter. The timing signal ADCCLK of the analog/digital converter is fast enough to retrieve each pixel data signal SIG outputted by the CIS. Therefore, the correct gray-scale values which have been compensated for each pixel can be obtained. Thus, the structure of the compensating apparatus can be simplified and the cost can be reduced.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto. For example, the gray-scale recognizable to the human eye is 64, if the precision is out of consideration, then some variations can be made as follows.

One variation is to replace the plural levels of voltage sources by a fixed voltage source of 1.6 V. Thus, the gray-scale compensating function can be achieved by combining the use of the analog/digital converter 34 and the CIS 32 with the microprocessor 36 and the memory 38 of the computer to perform partial step 106, step 108 and step 110.

Another variation is to use a voltage source which is closest to $V_{PMAX}$ to serve as the voltage output $V_{OUT}$ of the analog multiplexer, regardless of whether the voltage source is greater or smaller than the $V_{PMAX}$. That is, while $V_{PMAX}$= 1.24 V, $V_{OUT}$ is set as 1.2 V not 1.3 V. This results in the gray-scale for $V_{PMAX}$=1.2 V to 1.24 V being the same. However, the human eye can not detect such errors.

What is claimed is:

1. An apparatus for compensating the gray-scale value of an image sensor comprising:

a power supply for providing a plurality of different levels of voltage sources;

an analog multiplexer for receiving said plurality of different levels of voltage sources, being controlled by a digital signal to output one of said plurality of different levels of voltage sources;

an image sensor to scan an image pixel and output an image voltage of said image pixel;

an analog/digital converter for receiving the voltage output from said analog multiplexer as a top voltage $V_{TOP}$, and the image voltage output from said image sensor as an analog input, wherein said analog/distal converter outputs an original gray-scale value g(x,y) of the pixel;

a microprocessor to find a maximum white-level value $G_{MAX}$ among a plurality of original gray-scale values g(x,y) for one row of white pixels along an x coordinate axis, wherein a maximum white-level voltage $V_{PMAX}$ is defined as a voltage output by said image sensor while scanning pixels corresponding to $G_{MAX}$, said digital signal being set to control said analog multiplexer to output a voltage source closest to $V_{PMAX}$ to serve as the voltage output, and calculate an average white-level value G'(x) of the plurality of original gray-scale values g(x,y) for a plurality of white pixels along the y-axis direction, computing a compensated gray-scale value g'(x,y) of the pixel with said plurality of original gray-scale value g(x,y) of the pixel according to G'(x).

2. The gray-scale compensating apparatus as claimed in claim 1 wherein said power supply is a voltage divider consisting of a plurality of serially connected resistors.

3. The gray-scale compensating apparatus as claimed in claim 1 wherein said maximum voltage $V_{PMAX}$ is between a maximum and a minimum of said plurality of different levels of voltage sources.

4. The gray-scale compensating apparatus as claimed in claim 1 wherein the original gray-scale value of a pixel is compensated by dividing the original gray-scale value of the pixel being scanned with the average white-level value G'(x) corresponding to the x-coordinate of the pixel and then multiplying the maximum k of the original gray-scale value to obtain the compensated gray-scale value of the pixel g'(x,y)=kxg(x, y)/G'(x).

5. The gray-scale compensating apparatus as claimed in claim 1, wherein the microprocessor determines the digital signal to control the analog multiplexer, said analog multiplexer thereby selects a voltage that is at least larger than $V_{PMAX}$ as the voltage output.

6. A method for compensating the gray-scale value of a contact image sensor, in which the contact image sensor is parallel to an x-coordinate and can move along a y-coordinate perpendicular to said x-coordinate to scan images, comprising:

outputting a voltage from plural levels of voltage sources of a power supply to a terminal $V_{TOP}$ of an analog/digital converter to serve as a top voltage, scanning a line of a white plate by the contact image sensor, outputting white-level voltages $V_P$ for the scanned—line of pixels to the analog/digital converter, and comparing the outputs of the analog/digital converter with each other to determine the maximum white-level value $G_{MAX}$, then recording the x-coordinate corresponding to $G_{MAX}$;

determining a maximum voltage $V_{PMAX}$ that the contact image sensor can output corresponding to the pixels on the x-coordinate, said x-coordinate corresponding to $G_{MAX}$;

selecting a voltage $V_{OUT}$ at least larger than the maximum white-level voltage $V_{PMAX}$ from the plural levels of voltage sources to serve as the top voltage $V_{TOP}$ of the analog/digital converter;

moving the contact image sensor along the y-direction to scan a white plate n-lines, where n is an integer, inputting the white-level voltages generated by said scanned-line of pixels to the analog/digital converter, and calculating a white-level value G(x,y) of each pixel P(x,y);

determining an average white-level G'(x) according to said white-level value G(x,y) using the following equation:

G'(x)=[G(x,0)+G(x,1)+G(x,2)+ . . . +G(x,n−1)]/n, and recording G'(x) into a memory;

sequentially scanning each pixel P(x,y) while reading images, and outputting an image voltage $V_{IMG}$ to said analog/digital converter by the contact image sensor, then comparing said image voltage $V_{IMG}$, with $V_{TOP}$ and outputting the original gray-scale value g(x,y) to a microprocessor;

compensating said original gray-scale value g(x,y) of each pixel at the coordinates (x,y) in a scanned range according to said average white-level value G'(x) and a defined maximum white-level k by said microprocessor when said analog/digital converter sequentially outputs said original gray-scale values g(x,y), said compensated original gray-scale values for the pixels corresponding to each x-coordinate are calculated.

7. A gray-scale compensating method as claimed in claim 6, wherein the maximum white-level voltage $V_{PMAX}$ is between a maximum and a minimum of said plural levels of voltage sources.

8. A gray-scale compensating method as claimed in claim 6, wherein the n-lines of the white plate being scanned are 10 to 20 lines.

9. A gray-scale compensating method as claimed in claim 6, wherein the gray-scale compensation involves dividing the gray-scale value of the pixel being scanned with the average white-level value G'(x) corresponding to the x-coordinate of the pixel and, and then multiplying said product with the maximum k of the gray-scale value being defined, that is, the compensated gray-scale value of the pixel g'(x,y)=k×g(x,y)/G'(x).

10. A gray-scale compensating method as claimed in claim 6, wherein the plural levels of voltage sources are provided by dividing a voltage with a plurality of resistors.

11. A gray-scale compensating method as claimed in claim 6, wherein the voltage $V_{OUT}$ selected from the plural levels of voltage sources to serve as the top voltage $V_{TOP}$ of the analog/digital converter is closest to said selected maximum white-level voltage $V_{PMAX}$.

12. An apparatus for compensating the gray-scale value of a contact image sensor comprising:

a power supply for providing a fixed level of voltage source;

a contact image sensor for scanning an image and outputting image voltages $V_{IMG}$ of pixels of the image, or scanning a white pixel and outputting the white-level voltage $V_P$ of the white pixel;

an analog/digital converter, having two input terminals for receiving the fixed voltage from the power supply and the image voltage $V_{IMG}$ or the white-level voltage $V_P$, for outputting the white-level value G(x,y) of the pixel or the gray-scale value g(x,y) of the image not compensated;

a microprocessor able to
(1) calculate the average of n white-level values G(x,y), where n is an integer, and the average value G'(x)= (G(x,0)+G(x,1)+ . . . +G(x,n−1))/n, and
(2) figuring out gray-scale values g'(x,y) of the image being compensated by calculating the gray-scale values g(x,y) of the image not compensated in accordance with the value of G'(x).

13. A gray-scale compensating apparatus as claimed in claim 12, wherein the gray-scale values of the image are compensated according to the equation, g'(x,y)=k×g(x,y)/G'(x), in which k is the maximum of defined white-level values.

* * * * *